(12) United States Patent
Hulse

(10) Patent No.: US 6,865,315 B2
(45) Date of Patent: Mar. 8, 2005

(54) DISPERSION COMPENSATING FILTERS

(75) Inventor: Charles Andrew Hulse, Sebastopol, CA (US)

(73) Assignee: JDS Uniphase Corporation, San Jose, CA (US)

( * ) Notice: Subject to any disclaimer, the term of this patent is extended or adjusted under 35 U.S.C. 154(b) by 190 days.

(21) Appl. No.: 10/227,845

(22) Filed: Aug. 27, 2002

(65) Prior Publication Data

US 2003/0048985 A1 Mar. 13, 2003

Related U.S. Application Data

(60) Provisional application No. 60/315,339, filed on Aug. 29, 2001.

(51) Int. Cl.[7] .................................................. G02B 6/26
(52) U.S. Cl. ............................................ 385/27; 385/39
(58) Field of Search .............................. 385/27, 31, 37, 385/39; 359/588, 589, 584

(56) References Cited

U.S. PATENT DOCUMENTS

| | | | |
|---|---|---|---|
| 5,557,468 A | 9/1996 | Ip | 359/615 |
| 5,734,503 A | 3/1998 | Szipocs et al. | 359/584 |
| 5,841,918 A | 11/1998 | Li | 385/24 |
| 6,081,379 A | 6/2000 | Austin et al. | 359/584 |
| 6,154,318 A | 11/2000 | Austin et al. | 359/584 |
| 6,222,673 B1 | 4/2001 | Austin et al. | 359/584 |
| 6,285,504 B1 | 9/2001 | Diemeer | 359/578 |
| 6,301,042 B1 | 10/2001 | Pelekhaty | 359/359 |
| 6,301,049 B1 | 10/2001 | Kärtner et al. | 359/588 |
| 6,728,038 B2 * | 4/2004 | Hulse | 359/590 |
| 2002/0181106 A1 * | 12/2002 | Xia et al. | 359/578 |
| 2002/0196549 A1 * | 12/2002 | Randall et al. | 359/578 |
| 2003/0087121 A1 * | 5/2003 | Domash et al. | 428/641 |

* cited by examiner

*Primary Examiner*—Akm Enayet Ullah
*Assistant Examiner*—Sarah Song
(74) *Attorney, Agent, or Firm*—Allen, Dyer, Doppelt, Milbrath & Gilchrist, P.A.

(57) ABSTRACT

A filter device provides for the modification of the group delay of an optical signal without attenuation of adjacent optical signals in a WDM optical communication systems. The filters devices may be combined and used in various methods to modify the GD and dispersion. The filters are configured and designed to provide various controllable and different amounts of GD as well as dispersion at different over a range of wavelengths.

21 Claims, 14 Drawing Sheets

DISPERSION COMPENSATING FILTERS

CROSS REFERENCE TO RELATED APPLICATIONS

The present application claims priority to provisional application having Ser. No. 60/315,339 entitled "Thin Film All-Pass Filters for Phase Equalization, Dispersion Compensation and High Performance Filtering" filed on Aug. 29, 2001, which is incorporated herein by reference.

BACKGROUND OF INVENTION

The present invention relates to components for optical communications systems, specifically interconnection and coupling devices utilizing multilayer optical interference filters for group delay and dispersion compensation.

Optical communications systems comprise an interconnected network of optical fibers for transmitting a plurality of the optical signal channels between nodes in the network. In order to increase the capacity of existing optical communications systems, or provide for flexible reconfiguration, multiple optical signal channels may propagate between nodes simultaneously using time division and wavelength division multiplexing (WDM). Wavelength division multiplexing refers to a plurality of signal channels characterized by a different wavelength of light, while time division multiplexing refers to a time sequence allocation of digital signals within a common optical signal channel. Although information may be transmitted in analog format in a WDM system, the digital format is commonly used in telecommunications because of the higher data transfer rates and compatibility with time division multiplexing schemes deployed in electronic communications systems.

As a WDM communication system utilizes optical signals of different wavelengths the optical fiber network must be configured such that the time sequential nature of information traveling on different wavelengths between common nodes is not temporally distorted. While such temporal distortion is influenced by design and environmental factors, it is frequently due to the wavelength dependence of the refractive index within the optical media forming the waveguiding optical fiber. The velocity of light is decreased on transmission through a dense media, such as optical glass fibers, in proportion to the refractive index ratio between free space transmission, 1, and the refractive index of the optical glass at the signal channel wavelength $n_g$. As a refractive index of glasses vary with wavelength,$\lambda$, (i.e. $n_g=n(\lambda)$) optical signals will be distorted, that is distributed in arrival time at the terminal node in the communication system network in proportion to the distance between originating node and the terminal node. The change in refractive index of a material with wavelength is commonly referred to as chromatic dispersion. Thus, as the distance between nodes in the optical communication system increases, or the digital pulse width decreases in order to obtain greater signal transfer capacity, the inherent properties of optical glasses become a greater limitation on performance and reliability.

Chromatic dispersion of optical fiber is roughly constant over the 1550 nm communication window, and can be compensated by several techniques including dispersion compensating fiber, which has a radial gradient in refractive index to provide self correction, Fiber Bragg gratings, etc. However, certain wavelength filtering components such as multilayer interference filters (MLIF) can have significant dispersion characteristics due to a fundamental Kramers-Kronig type relationship between transmission spectrum and dispersion characteristics. This type of temporal distortion is also quantified as the group delay (GD), typically in units of pico-seconds (ps). As the GD characteristic varies substantially with wavelength over the narrow passband (that is the high transmission region corresponding to the allocation of signal channels at specific wavelength per ITU convention) of an MLIF, the derivative of GD with respect to wavelength is also denominated or characterized as the dispersion, typically in units of ps/nm (pico-seconds/nanometer). Such dispersion is difficult to compensate using conventional techniques such as dispersion compensating fiber.

Other sources of signal temporal distortion may arise for various active or passive components within the optical communication network, such as optical amplifiers, multiplexing filters, gain flattening filters, arrayed waveguides, Fiber Bragg gratings and the like, as well as temperature fluctuations. Accordingly, as an optical communication system is reconfigured for repair, maintenance or to meet changes in demand, the temporal distortion of signals may change in a manner that is not easily predictable. Numerous methods providing for the effects of GD, whether arising through the characteristics of the optical fiber or system components, have been developed. These methods include devices that either provide a fixed amount of compensation or an adjustable amount of compensation, or may be deployed at or between nodes in the optical communication system.

As new interconnections are required to insert such devices within the optical communication system it is desirable that the devices themselves, as well as the connections thereto, result in a minimum signal loss.

U.S. Pat. No. 5,557,468 in the name of Ip assigned to JDS Fitel Inc, of Nepean Canada issued Sep. 17, 1996 and shows a dual Gires-Tourneau (GT) etalon dispersion compensator. This '468 patent states that cascading two filters having the same reflectivity on the input/output mirrors has been suggested, but does not produce optimum results with respect to increasing the wavelength region over which the equalizer operates; The Ip patent illustrates that by cascading a first etalon with a second etalon having dissimilar reflectivity characteristics and being slightly offset in its center frequency response, it is possible to favorably extend the range of the output response. Although Ip's two etalons achieve their intended purpose of extending the operation wavelength range, it would be advantageous to have a device that provides a controllable constant amount of dispersion within a wavelength band of interest. That is, where tuning allowed different constant amounts of dispersion to be induced. Indeed, in it is also of interest to provide various types of dispersion compensation to a wavelength region of interest that corresponds to only a single optical signal channel. It is also of interest to provide an arbitrary dispersion compensation across a wavelength region as narrow as a single optical signal channel to permit matching of the dispersion of combined optical signal channels at different wavelengths; this is particularly true in instances where the commonly propagating optical signal channels will be subject to an additional compensation scheme.

Reflective MLIF's that provide dispersion or group delay compensation have been disclosed in U.S. Pat. Nos. 5,734,503; 6,301,049; 6,301,042; 6,222,673; 6,154,318 and 6,081,379, which are incorporated herein by reference. However, these solutions are inapplicable to a WDM system as they do not provide for single channel compensation and/or attenuate or reject the other optical signals, that is those not intended to be compensated. Further, these thin film design approach all achieve the desired group delay or dispersion control on reflection from dielectric stacks wherein the optical thickness of the quarterwave layers is perturbed to improve the group delay over the reflective stacks bandwidth. These filter designs are inapplicable not only when the modification of only a narrow bandwidth is desired, but also do not generally provide the level of GD or dispersion correction required in an optical communication system.

Accordingly, yet a further objective of the invention is to provide dispersion correction devices that are simple, compact and thermally stable.

It is also an objective of the present invention to compensate for the dispersion from WDM devices that comprise MLIF's, including multiplexers, demultiplexers, gain flattening filters and interleavers.

Accordingly, it is an object of the present invention to provide a MLIF that provides for chromatic dispersion compensation of an individual optical signal channel in the ITU grid.

It is also an object of this invention to provide a dispersion compensator that will provide a certain amount of dispersion over a predetermined wavelength band.

Yet another object is to provide, fixed, variable and non-linearly variable GD and dispersion compensation over a wavelength range corresponding to a single optical signal channel, as well as multiple optical signal channels.

It is a further object of the invention to provide devices and methods that permit tunable levels of GD and dispersion compensation or correction with a reduced of signal loss.

It is another object of the invention to provide a dispersion compensator that will provide tunable dispersion compensation over a range of wavelengths.

SUMMARY OF INVENTION

The first object is achieved by providing a Fabry-Perot (F-P) type MLIF with a high transmission over a first wavelength range, or bandwidth, in optical communication with another optical component that is highly reflective over a greater bandwidth wherein the F-P structure provides the desired group delay to optical channel signals that are partially transmitted as well as twice transmitted through the F-P structure, due to reflection off the highly reflective optical component. The F-P structure of the inventive device comprises 2 or more optical cavities. Each optical cavity comprises a spacer layer or layers that surrounded by a pair of reflective elements that themselves comprise multiple dielectric layers of alternating high and low refractive index. The materials, thickness and refractive index of the spacers, dielectric layers and the arrangement of the optical cavities are selected to provide the desired group delay across the bandwidth defined by the transmission characteristics of the F-P structure. This structure provides the flexibility to correct over both broad and narrow bandwidths. As the spacers have a physical thickness of less than about 200 microns higher multiple orders of the transmission band, or passband regions, are well separated in wavelength such that optical signal channels having a spacing on the order of magnitude of this dispersion compensating (DC) filters bandwidth are reflected without either substantial modification in group delay or attenuation.

In the present invention, yet another objective is achieved by selecting and arranging the layers of the F-P MLIF such that the wavelength varying group delay inherent in a narrow bandpass filter, that is of the type used for wavelength separation of adjacent optical signal channels, is either substantially compensated or provided with a fixed delay across the wavelength range allocated to the optical signal channel associated with the narrow bandpass filter.

In accordance with another aspect of the invention another objective is achieved by selecting and arranging the layers of the F-P MLIF to provide a group delay that varies in a predetermined manner across a wavelength range allocated to the optical signal channel associated with the passband of the F-P structure. The group delay may vary so as to provide either a single-sloped or monotonically sloped dispersion output response within at least a predetermined wavelength band.

In accordance with another aspect of the invention a method for compensating dispersion in an optical signal is provided wherein the optical properties and/or physical dimension of at least some of the layers of F-P MLIF are responsive to an external stimulus such that the amount of dispersion induced by the filter within the predetermined wavelength band can be varied or tuned in a controllable manner with minimal signal loss over the tuning range.

In accordance with another aspect of the invention a method for compensating dispersion in an optical signal is provided, comprising the steps of: providing a first optical filter having a single-sloped or monotonically sloped dispersion output response within at least a predetermined wavelength band; providing a second optical filter having a single-sloped or monotonically sloped dispersion output response within at least a predetermined wavelength band, wherein the first and second filters have slopes of opposite sign; tuning one of the first and second filters in a controllable manner to vary the amount of dispersion induced by the filter within the predetermined wavelength band with minimal signal loss over the tuning range.

The inventive F-P MLIF's are simpler to manufacture, and hence expected to be of much lower cost than an etalon-based device. Furthermore they can be constructed, like narrow bandpass filters, so as not to require temperature stabilization of the non-tunable elements. The inventive devices offer far more complex performance than the prior etalon-based designs.

Additionally, In comparison with a fiber-bragg grating (FBG), thin-film compensators offer less group delay ripple due to the higher contrast achievable and hence lower layer count, as well as potentially less packaging cost. In contrast to the FBG, the MLIF does not attenuate the adjacent optical signal channels.

The above and other objects, effects, features, and advantages of the present invention will become more apparent from the following description of the embodiments thereof taken in conjunction with the accompanying drawings.

DETAILED DESCRIPTION

The structure and function of the various embodiments of the invention is best understood in reference to the construction of a multiple layer interference filter used in wavelength division multiplexing (WDM) application. The term multiple layer interference filter (MLIF) refers to an optical device that filters transmitted or reflected light by wavelength selective interference as they are constructed from multiplicity of optically coupled layers having different optical properties. Such filters are useful in separating and combining optical signals transmitted on common optical waveguides by at a slightly different wavelength to increase the overall data transmission capacity, as they do so with minimum signal loss or attenuation. The filters commonly deployed in WDM systems are also described as narrow bandpass filters, as they exhibit a narrow wavelength region of high transmission, the bandpass, with adjacent wavelength regions being highly reflective to reject wavelengths corresponding to adjacent optical signal channels.

In summary, a MLIF comprises dielectric materials of differing refractive index, typically alternating layers of two or more high and low refractive index so that the light is partially reflected at the interface between the layers of differing refractive index. As the wavelength of the reflected light is determined by the optical thickness of the layers, the overall transmission and reflection characteristics are wavelength dependent due to selective interference. The thickness of these layers is generally selected to have an optical path length of about a quarter wavelength, with the thickness and order of the layers being varied to achieve the desired filter characteristics as a function of wavelength.

The classic F-P structure is the simplest interference structure, as it minimally requires 2 layers that are at least partially reflective. It can generically be described as a pair of optically spaced reflective surface wherein the optical path difference results in the wavelength selective interference characteristics.

The generic F-P structure can be combined or constructed from different MLIF's as the reflective surfaces can be formed from dielectric materials, so that the reflectors partially reflect and transmit in differing proportions over specific wavelengths. Additionally, these dielectric reflectors can be separated by optical spacer of dielectric materials. The dielectric reflector is primarily constructed from high and low refractive index materials having an optical thickness on the order of a quarter wavelength, the reference wavelength being the center wavelength position of the reflective, or stop band of the dielectric reflector. However, in a bandpass MLIF the spacer layer optical thickness is one or more integer multiples of the half the reference wavelength.

Figure 1:
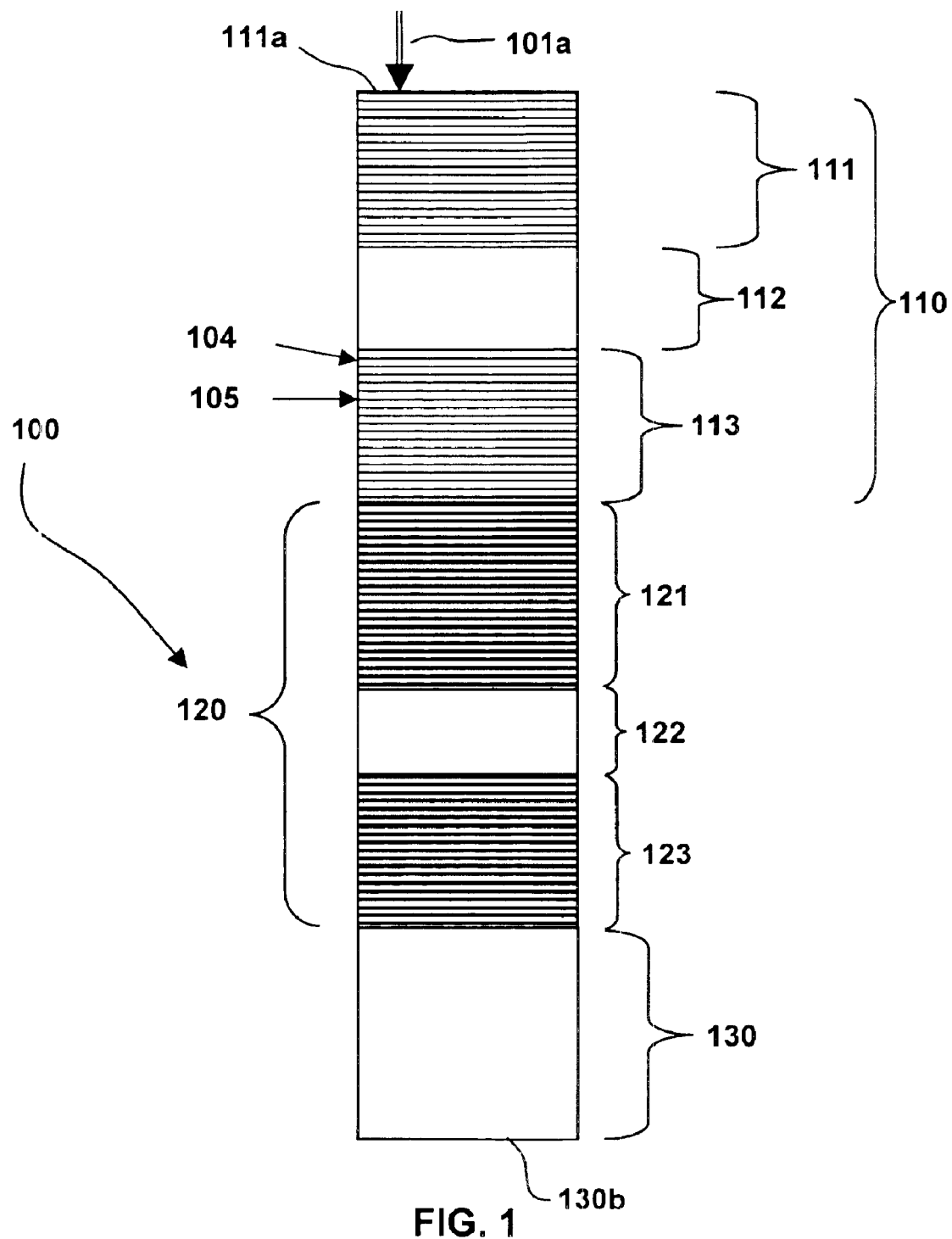
FIG. 1 is a cross-section of a narrow band pass filter illustrating the structure of the multiple thin film layers.

Such an exemplary narrow band pass filter 100 is illustrated in cross section in FIG. 1. When the filter is used in transmission, incident radiation, shown as optical beam 101a, can arrive from either the front surface 111a or rear surface, 130b. The first optical cavity 110 comprises a pair of reflector layers 111 and 113 surrounding the associated spacer 112. The reflectors comprise multiple pairs of dielectric layers of alternating high and low refractive index, such as high refractive index layer 104 and low refractive index layer 105. The second optical cavity 120 comprises pairs of dielectric reflector layers 121 and 123 surrounding the associated spacer layer 122. Reflectors 121 and 123 also comprise multiple pairs of dielectric layers of alternating high and low refractive index.

Although only two cavities are shown such filters frequently deploy three or more optical cavities in order to narrow and refine the shape of the passband region to a "square" profile in order to more fully isolate the adjacent optical signal channels, thus preventing cross-talk and attenuation.

However, such optimization of the passband shape as the signal channel spacing decreases can compromise overall system performance and reliability due to the group delay characteristics of the filter, particularly at higher data communication rates, particularly beyond about 20 GB/sec. due to the temporal distortion of digital pulses, which occurs as selected wavelengths are trapped within each optical cavity.

Figure 2:
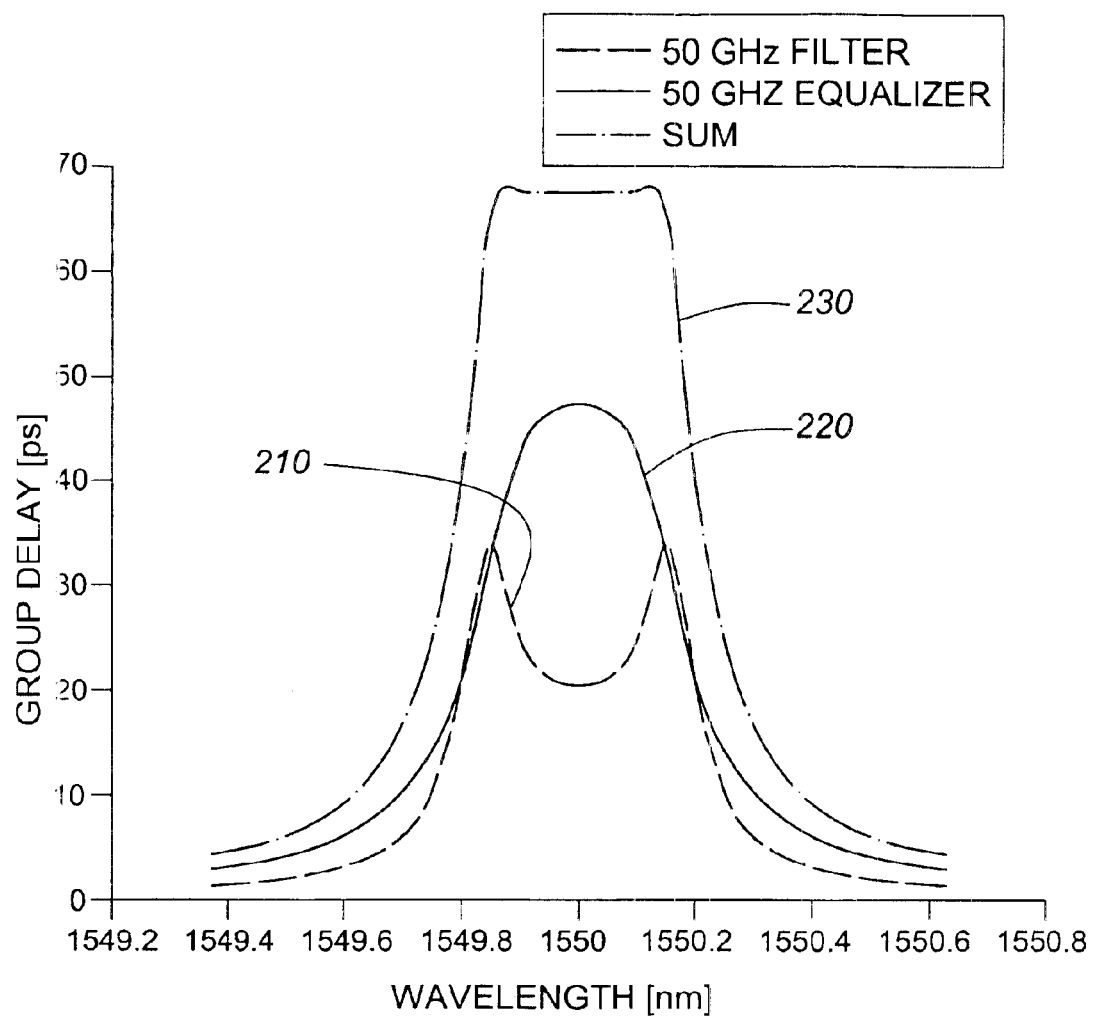
FIG. 2 is a plot showing the wavelength dependence of the group delay for the bandpass filter design in Table 1(210) along with the preferred group delay for an equalizing or dispersion compensating filter (220) and the cumulative group delay when two such filters are coupled in series (230)

Turning to FIG. 2, the wavelength dependence of the group delay is illustrated for a narrow bandpass filter having a 50 GHz. bandwidth (210) generically illustrated in FIG. 1, but having the optical design parameters in Table I wherein the optical thickness of each spacer is spacer in nm, the reflectivity of the surrounding dielectric reflectors is specified in % reflection and their quarterwave optical thickness is expressed in nm. This filter has two discrete maxima in GD within the passband region that are separated by a local minimum in GD at the bandpass center wavelength. Thus the filter exhibits significant dispersion, or change in GD with wavelength.

FIG. 2 also shows the wavelength dependence of the group delay for a preferred equalizing or dispersion compensating filter (220) having the optical design parameters in Table II. The cumulative group delay (230) results from the serial optical connection with narrow bandpass filter 210, corresponding to the output of the device shown in FIG. 4. The specific optical design parameters in Table II will be more fully described with reference to FIG. 3.

As illustrated in FIG. 2, the optimum dc filter (220) for correcting the GD of the "square" shaped bandpass filter (210) has a single maximum in group delay with constantly decreasing GD on both the longer and shorter wavelength sides of this maximum. The GD also tapers to about zero near the edge of the narrow bandpass filters passband region, and is thus coincident with the rising side of the narrow bandpass filter (210), i.e. the two maxima in group delay have the greatest slope, or dispersion, the edge of the passband.

Additionally, it is preferable that the compensating device does not attenuate the optical signals, such that the composite device transmission function is as close as possible to 100%, preferably above 95%. In addition, the center wavelength of maximum in GD for the dc filter is preferably matched to the ITU grid spacing.

Figure 3:
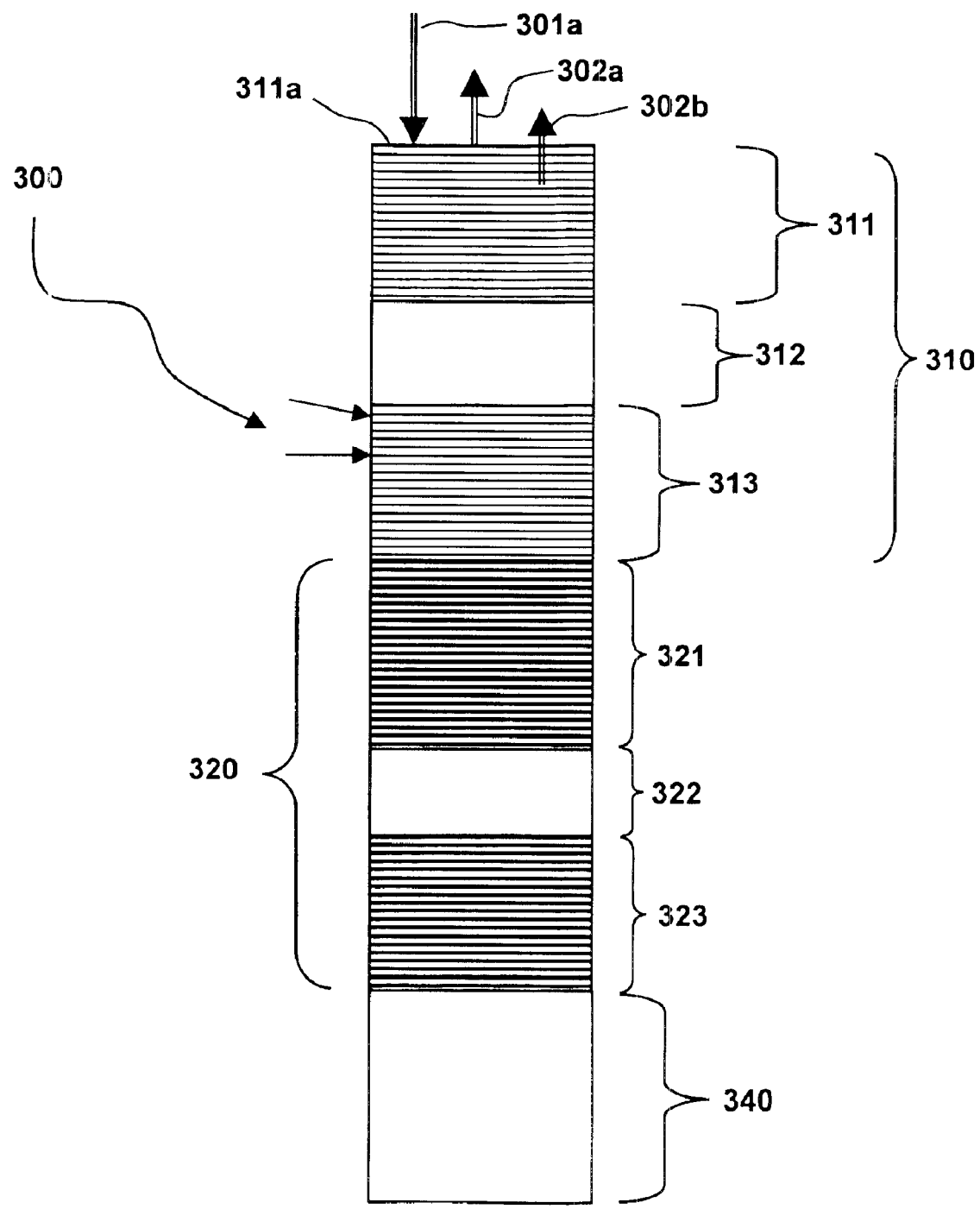
FIG. 3 is a cross-section of an embodiment of a dispersion compensating filter illustrating the multiple thin film layers.

FIG. 3 is a cross-section illustrating a first embodiment of the dc filter capable of providing the desired level of GD or dispersion compensation described in FIG. 2. Dispersion compensating filter 300 comprises two or more optical cavities 310 and 320, each having spacers 312 and 322 respectively. Each of spacers 312 and 322 is surrounded by an identical pair of dielectric reflectors 311 and 313 for spacer 312; 321 and 323 around spacer 322.

The dielectric reflector pairs surrounding each spacer while being partially reflective and partially transmissive are generally not identical. The optical cavity may comprise the same, different or combinations of dielectric materials used to form any of the surrounding dielectric reflector layers.

As opposed to the transmissive narrow bandpass filter in FIG. 1, dispersion compensating filter 300 comprises a terminal reflector 340 in optical communication with the last dielectric reflector 323. Although optical beam 301a is first incident on surface 311a of dielectric reflector 311 and such a filter would transmit wavelengths having a modified GD, all wavelengths are eventually reflected, exiting dc filter 300 at the entrance face 311a as rays 302a, to illustrate wavelengths that would reflect without reaching terminal reflector 340, and 302b to represent wavelengths that would ordinarily be at least partially transmitted without terminal reflector 340. Thus while the GD is modified by transmission over the wavelength range determined by the structure, number and order of each optical cavity and the associated dielectric reflectors, the surrounding optical channels signals continue to co-propagate on exiting the filter, but without group delay modification.

Additionally, the optical cavities forming the F-P structures in the dc filter may comprise multiple cavities of different materials and/or thickness depending on the desired range and value of the wavelength dependent group delay. According, the design and operating principles that follow will be further extended in additional embodiments, adding specific functionality and performance as discussed below.

The number of optical cavities in dispersion compensating filter 300 is selected to provide a passband wavelength region corresponding to the narrow bandpass or other MLIF being compensated. As the thickness of the spacer layer also determines the free spectral range of the device, that is wavelength separation between transmission passbands of different order, a thickness of 200 microns or less provides narrow band compensation with sufficient separation of multiple orders.

Accordingly, as opposed to the much thicker etalon type compensation devices, the spacer layers and dielectric reflector layers in the dc filters are fabricated by the same thin film deposition methods to create compact monolithic devices in a single process.

While the detail designs and application of such filters is described, infra, with respect to additional embodiments of the invention, the benefits of this construction accrue from the cooperative optimization of the cavity and reflector properties. As shown in each of the examples the reflector stacks surrounding each optical cavity are designed to a predetermined level of reflectivity to achieve the desired wavelength dependent group delay.

More specifically in a preferred or optimized dispersion compensating filter the dielectric reflectors are arranged in order of increasing reflectivity from the first spacer, that is the one most distal from the terminal or broadband reflector, to achieve the desired wavelength dependence of group delay. The progressive increase in reflectivity as light enter the dc filter causes a correspondingly increase in efficiency or "Q" factor of each optical cavity such that selected wavelengths are multiply reflected a greater number of times in the optical cavities closer to the terminal reflective element; Q being defined as:

$$Q = \omega W / P_L$$

In which X is the angular resonance frequency (=2 pif), W is the stored energy within the cavity and $P_L$ is the average power lost on partial transmission.

This progressive increase in the number of reflections means that these wavelengths will be delayed more than wavelength that are rejected by the optical cavities closer to the entrance face of the dc filter.

Accordingly, a range of dispersion characteristics are possible by adjusting the dielectric reflector values and spacer thickness. Those of ordinary skill in the art of thin film design will appreciate that known thin film design techniques, such as those used to optimize bandpass filters, are applicable to refining the reflectivity between spacers per the examples in Table II, III and IV. These include increasing the number of pairs of high and low refractive index layers in the so called quarterwave stacks that form each pair of dielectric reflectors, inserting Herpin structures (to increase the effective index ratio) within the quarterwave stack structure, changing the ratio between H and L (by changing one or more materials, or the thickness ratio of H to L) for the reflectors associated with each of the optical cavities, or the optical cavity itself. This is accomplished, in a non-limiting example, by using materials of progressively higher refractive index for the H layer in each of the spacers.

Alternatively, additional optical halfwave layers can be inserted in the optical spacers to increase the "Q" factor via increased energy storage by phase dispersion, as well as by changing the dielectric materials used to form the spacer layers. As the spacers are not limited to a single dielectric material, a mixture of halfwaves of L and H materials, as well as any additional dielectric materials, can be deployed to change the effective reflectivity at each optical cavity. For example the number or fraction of H layers might increase in one or more of the spacer to increase the effective "Q" as a alternative to modifying the dielectric reflector materials or designs. Q can also be adjusted by making intracavity reflector stacks non-quarterwave or by inserting additional half-wave layers in a variety of places within the dispersion compensating filter.

Although the preferred embodiment utilizes multicavity F-P structures, the various multipass arrangements disclosed herein enable a plurality of single cavity F-P structures to be utilized in combination with a terminal reflector having a high reflectivity (over the desired bandwidth) to achieve the same functional performance. It should be appreciated that such configurations may require greater complexity to avoid signal losses at the optical interconnections, most of which are avoided in the monolithic structure in FIG. 3.

In addition to equalizing or correcting for the dispersion of group delay equalization of another filter, such as the single narrow bandpass filter, illustrated in FIG. 1, the inventive structure can be expanded with additional cavities, each having a terminal high reflector, and appropriately selected dielectric reflectors and spacers to provide other variations of group delay with wavelength including: 1) introduction of a constant or sloped dispersion across a single WDM channel (narrowband dispersion compensation) and 2) tunable dispersion compensation for a single optical signal channel.

For example, in certain instances it is desired to modify the dispersion in a narrow wavelength band corresponding to a single optical channel in a WDM system. Modification of dispersion can be used to suppress cross talk from adjacent channels and other non-linear effects, which can introduce unwanted noise into the system.

Figure 4:
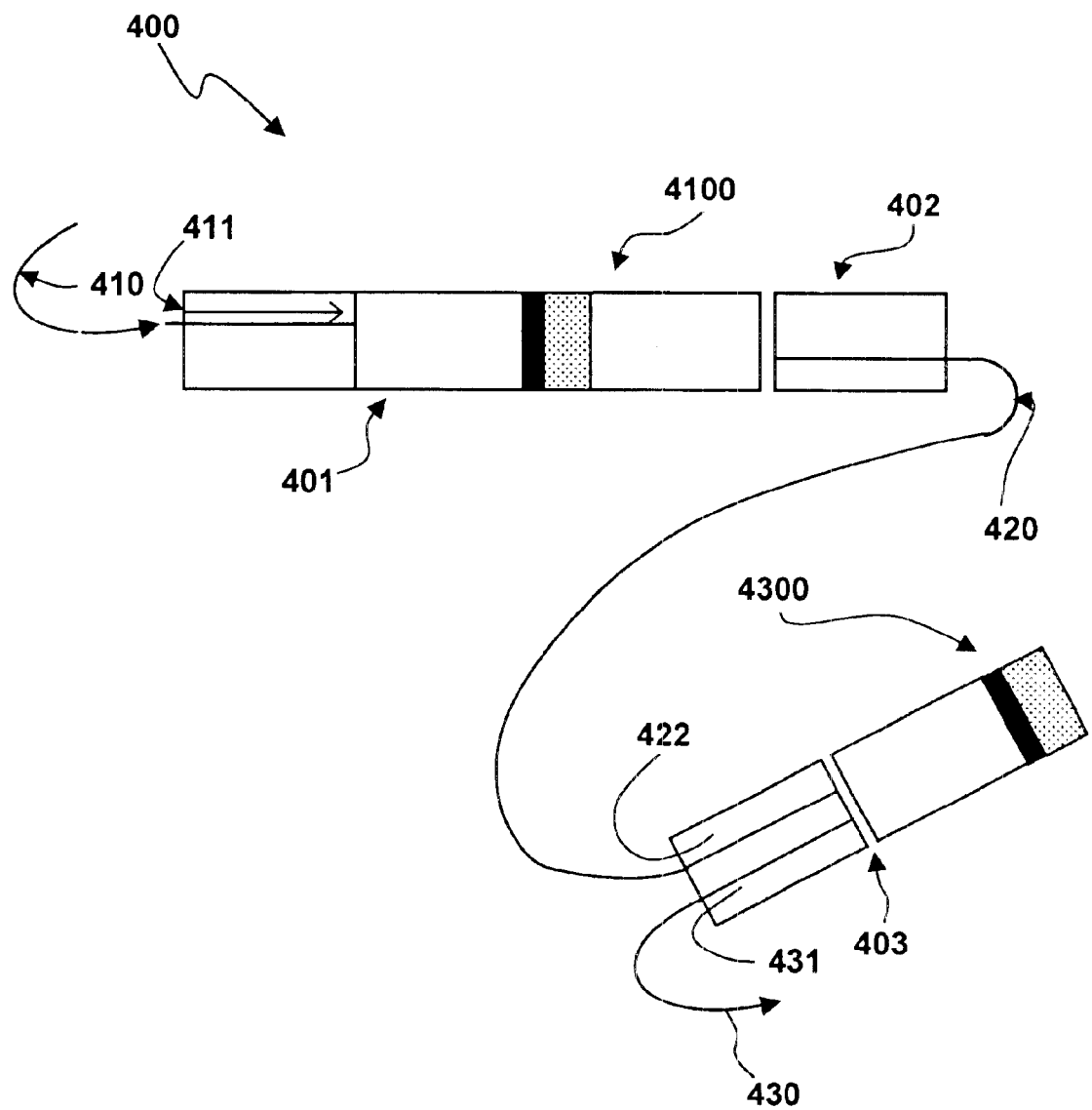
FIG. 4 illustrates an optical circuit for combining a narrow bandpass filter with a dispersion compensating filter to achieve the resulting uniform group delay (230) across the passband of the narrow bandpass filter plotted in FIG. 2.

FIG. 4 illustrates the optical circuit for combining the filter in FIG. 1 with the dc filter in FIG. 3. In device 400 optical signals arriving at bandpass filter 4100 via optical fiber 410 are subsequently compensated by dc filter 4300. Collimating lens 401 receives optical signals from optical fiber 410 at optical port 411 such that an expanded collimated beam is incident on bandpass filter 4100. Another collimating lens 402 couples transmitted light into optical fiber segment 420 for transmission to dc filter 4300 via collimating lens 403. Collimating lens 403 receives optical signals from optical fiber 420 at optical port 422 such that an expanded collimated beam is incident dc filter 4300. The beam reflected by dc filter 4300 is coupled into optical fiber 430 at optical port 431 on collimating lens 403, thus providing wavelength dependent group delay without beam attenuation.

TABLE I

| Optical Cavity # in filter 4100 | Spacer Optical Thickness in nm | Reflectivity, % | Reflector qw optical thickness |
|---|---|---|---|
| 1 | 5425 | 98.67 | 1550 |
| 2 | 5425 | 99.32 | 1550 |
| 3 | 5425 | 99.32 | 1550 |
| 4 | 5425 | 98.67 | 1550 |

TABLE II

| Optical Cavity # in filter 4300 | Spacer Optical Thickness in nm | Reflectivity, % | Reflector qw optical thickness |
|---|---|---|---|
| 1 | 6200 | 81.76 | 1550 |
| 2 | 6200 | 98.11 | 1550 |
| 3 | 6200 | 99.25 | 1550 |
| 4 | 6200 | 99.58 | 1550 |
| Terminal Reflector | | 100 | |

Figure 5:
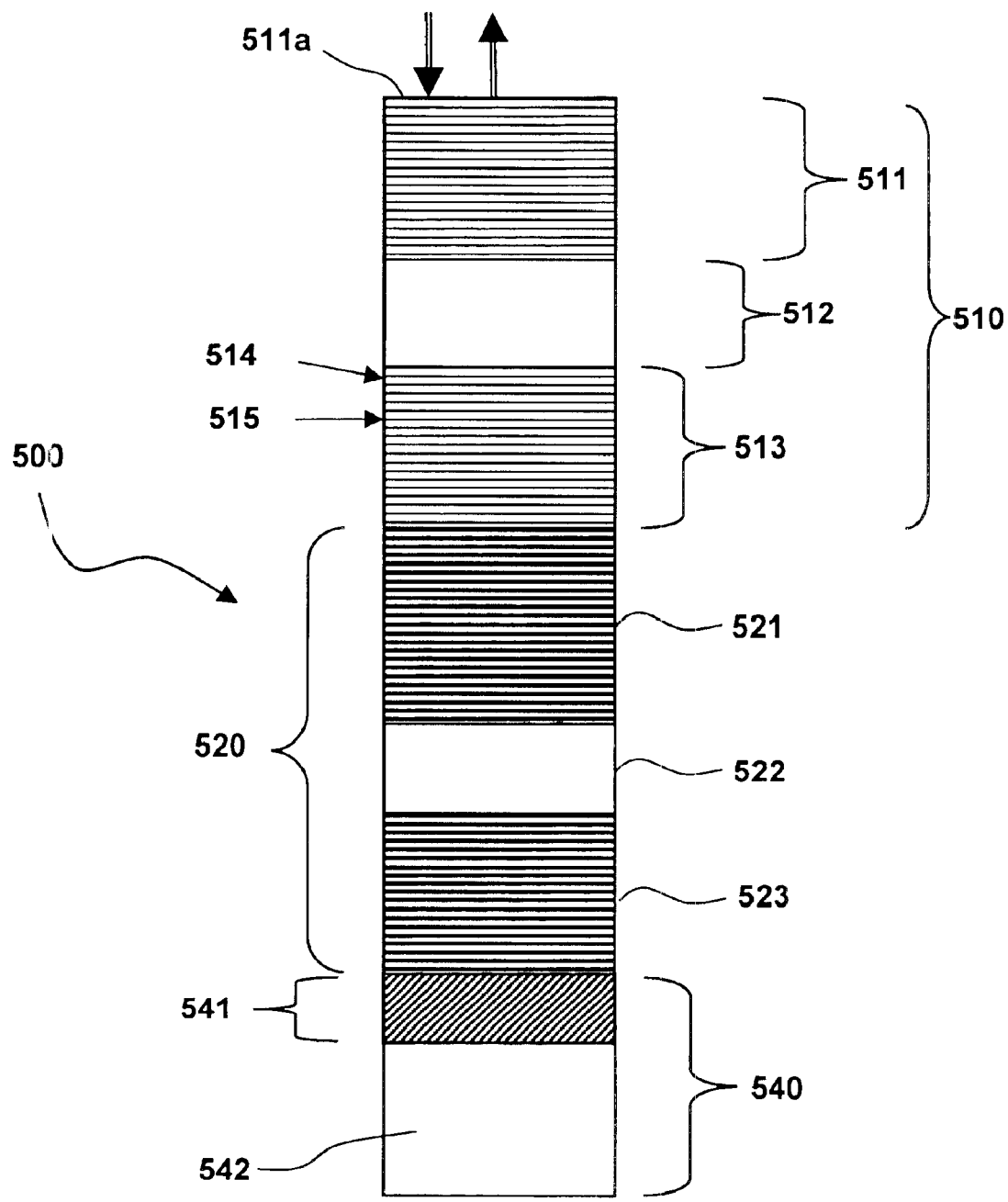
FIG. 5 is a cross-section of an alternative embodiment of a dispersion compensating filter illustrating the multiple thin film layers. The reflector at the distal end of the filter comprises a broadband reflecting coating or multi-layer structure deposited on a supporting substrate.

FIG. 5 illustrates an alternative construction for an inventive dispersion compensating filters, according to the operative principles disclosed in FIG. 3. DC filter 500 comprises a first optical cavity 510 and a second optical cavity 520. In this illustration broadband reflector 540 comprises a reflective layer disposed on a supporting substrate 542. Reflector layer 541 can be a metallic material deposited onto a substrate as a single layer, for example gold or copper which are highly reflective in the near infrared and infrared wavelengths, a dielectric reflector (including a quarterwave stack), or reflective metal or other material having a higher or enhanced reflectivity from the addition of one or more pairs of dielectric layers of high and low refractive index. Any of these embodiments, and equivalents, will be satisfactory, provided the bandwidth of reflector 540 is greater than the passband of the overlaying F-P structure to avoid the attenuation of optical signal channels at adjacent wavelengths.

Figure 6:
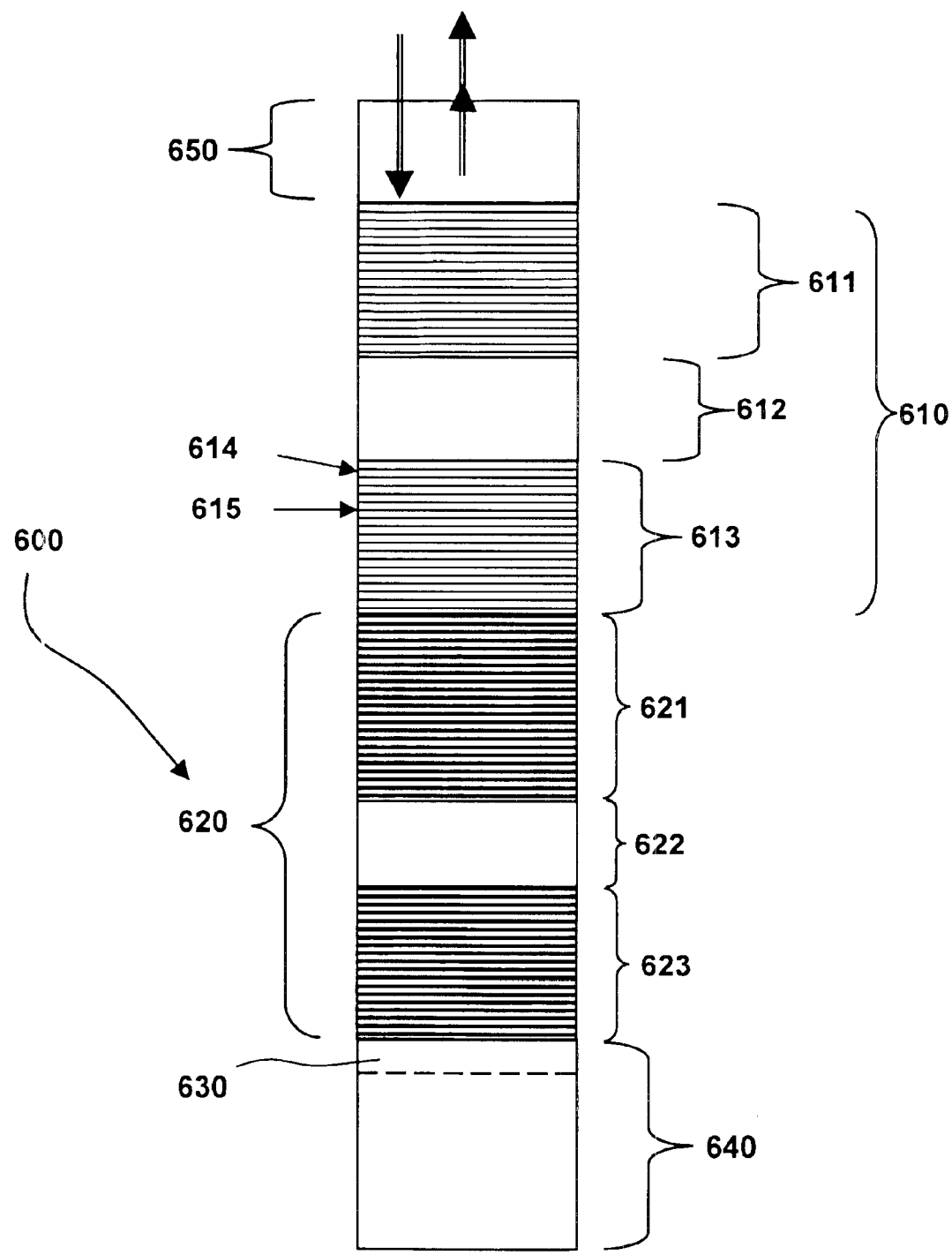
FIG. 6 is a cross-section of an alternative embodiment of a dispersion compensating filter illustrating the multiple thin film layers in which the optical cavities are first deposited on a transparent substrate that forms the incident side of the dc filter.

FIG. 6 illustrates an alternative embodiment of a dc filter according to the operative principles disclosed in FIG. 3. DC filter 600 comprises a first optical cavity 610 and a second optical cavity 620. This configuration permits the optical cavities to be deposited on a transparent substrate 650. Thus broadband reflector 640 may comprises one or more layers 630 to provide sufficient reflectivity and bandwidth, as optical beam 601 a is first incident on a transparent substrate 650. The construction of the filter can then terminate in the deposition of the terminal reflector such on the last dielectric reflector layer, as well as equivalent means of optical communication between the last optical cavity 620 and broadband reflector 640.

Figure 10A:
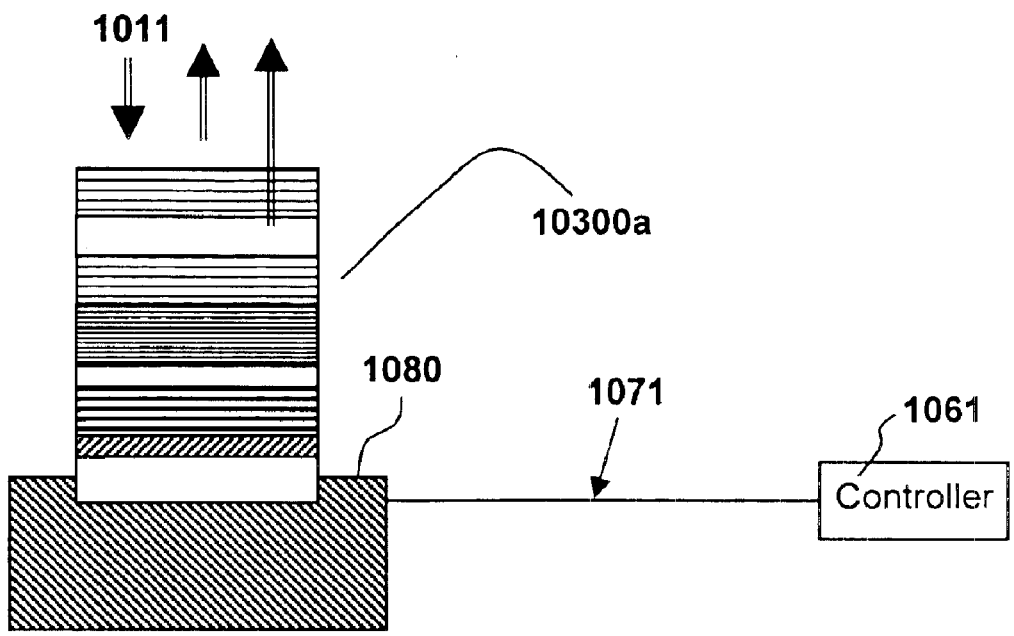
FIG. 10 illustrates structures and operative principles of tunable dc filters (a) with an actuator for thermal or index tuning and (b) rotateable for angle or tilt tuning.

As will be discussed in further detail with respect to FIG. 10a the alternative locations of a supporting substrate, that is at either end of the inventive dc filters shown in FIGS. 5 and 6, permits the substrate, or other elements attached thereto, to provide a means for either thermal stabilization of the device, or to controllable modify the optical path length of the spacers to tune the dc filter performance.

Figure 7:
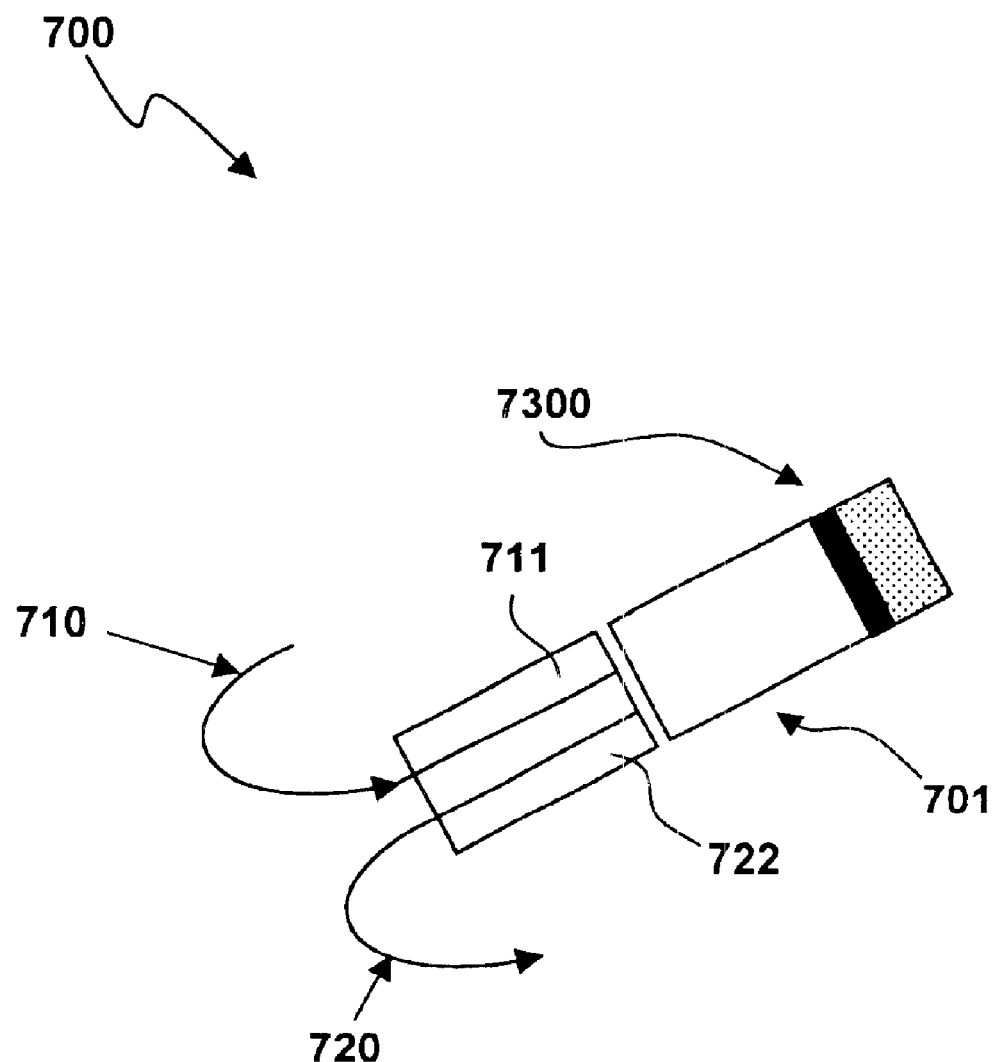
FIG. 7 illustrates the optical configuration of an alternative a dispersion compensating filter for producing a non-uniform GD across a selected wavelength range.

In another embodiment the dc filter is designed to provide either linear or non-linear increases in dispersion across 60 GHz. bandwidth. FIG. 7 illustrates the optical configuration of such a dc filter used in a coupling device. In device 700 optical signals arrive at dc filter 730 via optical fiber 710. Collimating lens 701 receives optical signal from optical fiber 710 at optical port 711 such that an expanded collimated beam is incident on dc filter 7300. The beam reflected by dc filter 7300 is coupled into optical fiber 720 at optical port 722 on collimating lens 701, thus providing wavelength dependent group delay without substantial signal attenuation.

Figure 8:
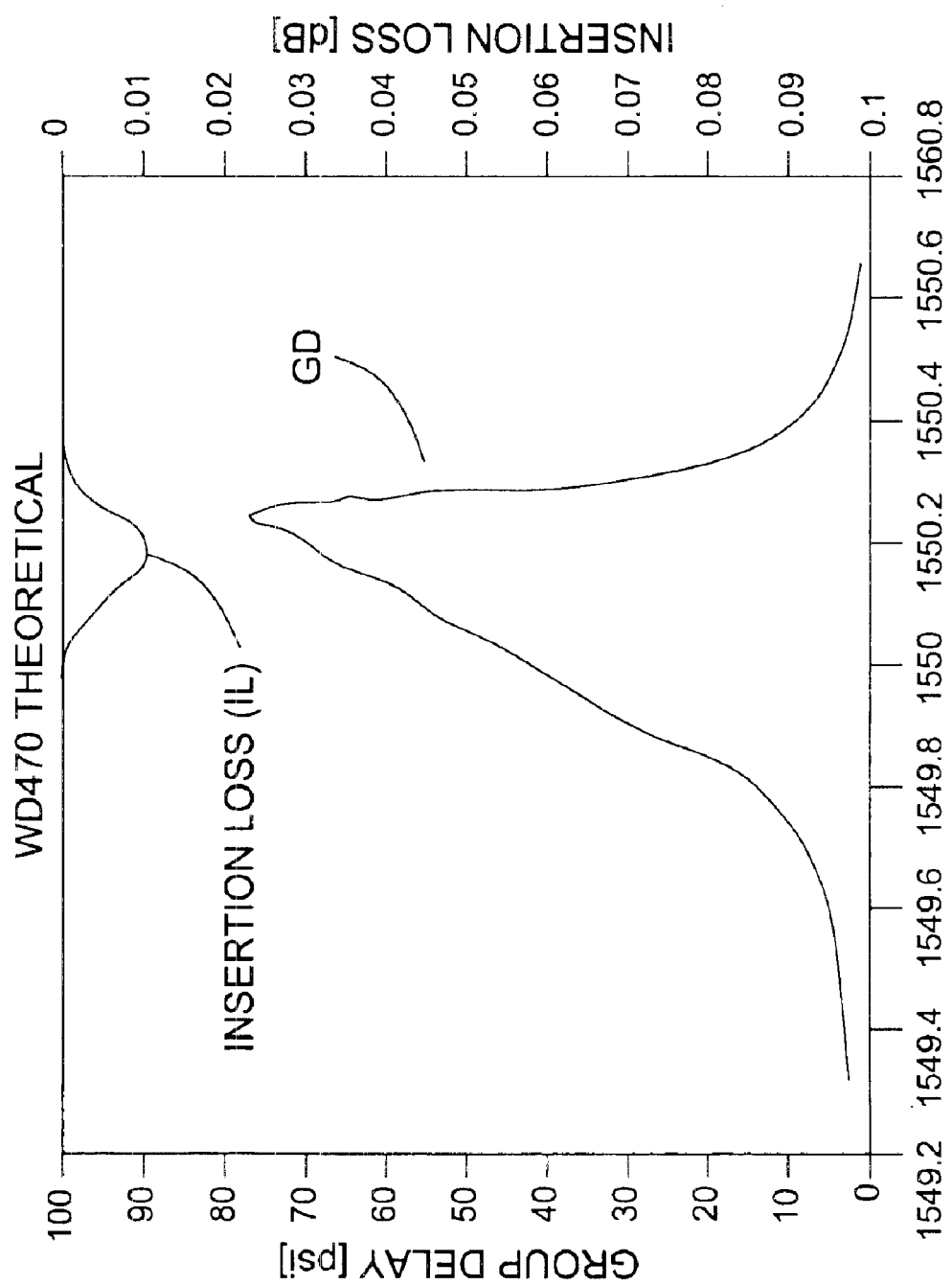
FIG. 8 is a plot showing the theoretical wavelength dependence of the group delay for an alternative dispersion compensating filter having the optical cavity parameters in Table I.

FIG. 8 shows the theoretical group delay of such a dc filter having 4 optical cavities, as detailed in Table III In this particular design the GD has a linear change with wavelength to provide a constant dispersion of about 150 ps/nm over about a 60 GHz bandwidth.

TABLE III

| Optical Cavity # in filter 7300 | Spacer Optical Thickness in nm | reflectivity, % | reflector qw optical thickness |
|---|---|---|---|
| 1 | 5425.33 | 97.58 | 1550 |
| 2 | 5425.39 | 98.99 | 1550 |
| 3 | 5425.51 | 99.35 | 1550 |
| 4 | 5425.68 | 99.61 | 1550 |
| Terminal reflector | — | 99.76 | 1550 |

Figure 9:
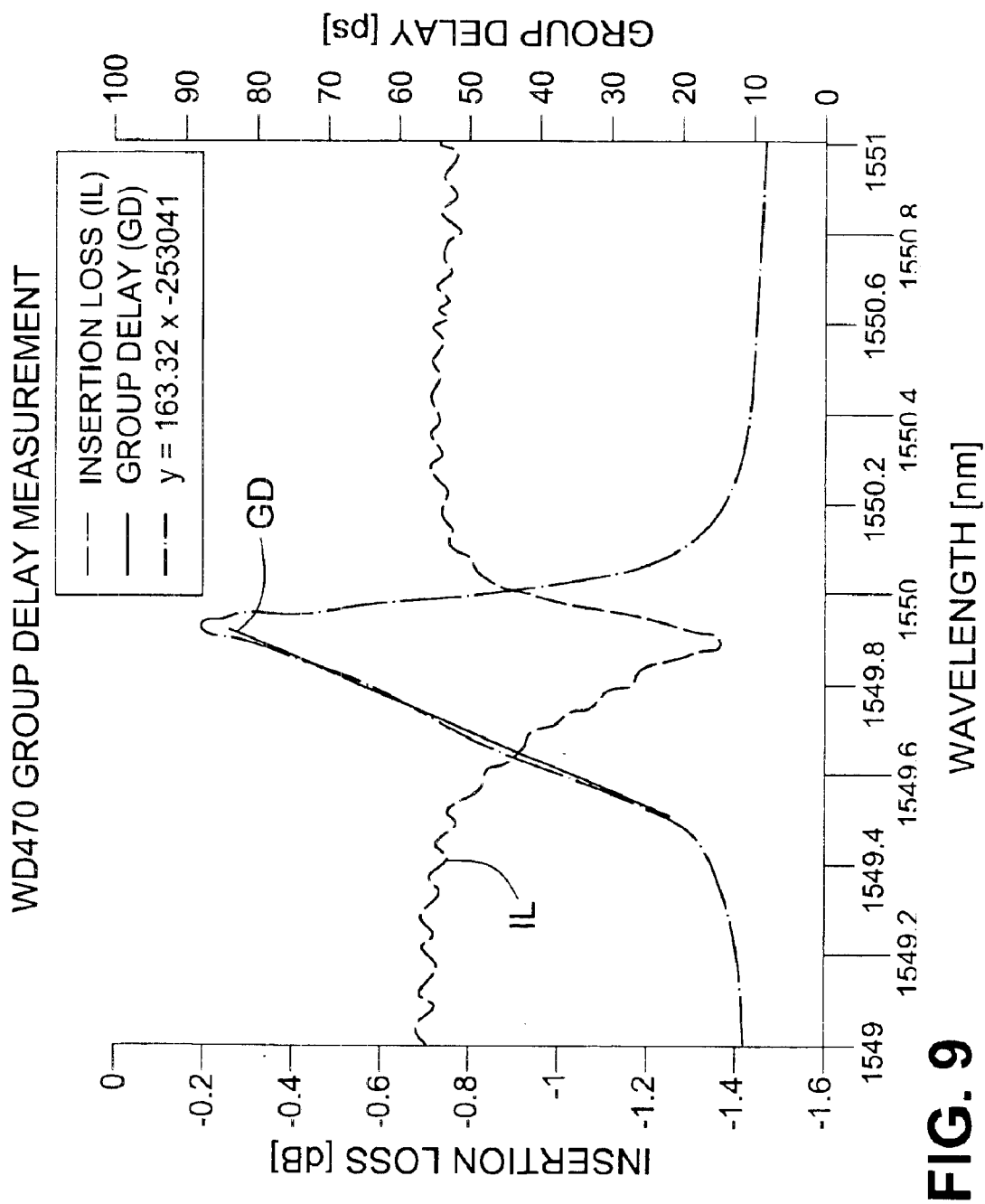
FIG. 9 is a plot showing the actual wavelength dependence of the group delay for the alternative dc filter defined by the optical cavity parameters in Table I in the optical configuration illustrated in FIG. 7.

The actual performance for the dc filter defined in Table III is illustrated in FIG. 9. The optical attenuation, as insertion loss of the device in FIG. 8, is greater than the theoretical value in FIG. 7, that is 1.7 dB vs. 0.01 dB, due to insertion losses at optical ports 721, 722, as well as other factors. However the linearly increasing region of GD has substantially the same value and bandwidth as the theoretical performance.

Figure 10B:
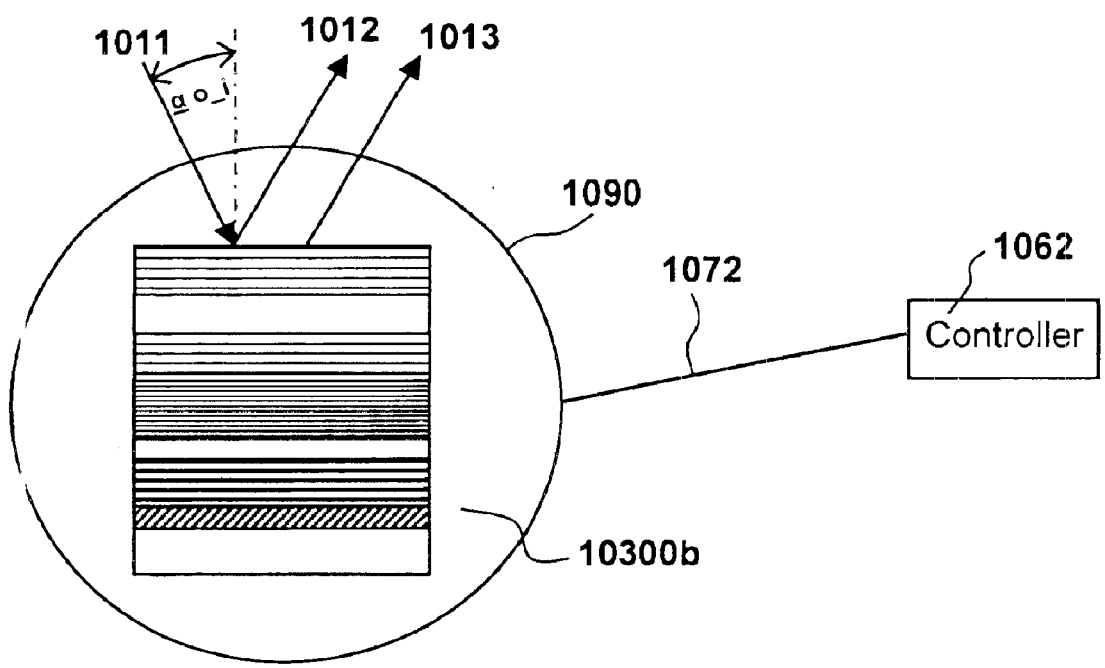

In another embodiment of the invention the wavelength position of the desired GD features can be shifted toward either longer or shorter wavelengths without substantial change in spectral shape. Increasing the optical path length of the spacer layers results in a shift in the characteristic GD features to shorter wavelengths. FIG. 10a and 10b conceptually illustrate known methods for modifying the optical path length in F-P filters that can be deployed with the inventive dc filter designs. In FIG. 10a dc filter 10300 is modified by an actuator 1080 in response to a signal or power from controller 1061 via circuit 1071. As the optical path length can be changed by modifying the refractive index or physical dimensions of the spacer layers actuator 1080 provides suitable thermal, mechanical, electrical or magnetic stimulus to modify the spacer materials either directly, or via another responsive component in physical contact with dc filter 10300a. Such means include using a substrate, as well as optical thin film layers, with a high coefficient of thermal expansion. Accordingly, it may be desirable to utilize a metallic substrate as described with reference to FIG. 5, or a transparent substrate as described in reference to FIG. 6. The selection of heater or other actuator location will depend on the overall dc filter thickness, and in the case of a thermo-optical thin film layers, the need to directly heat all of the spacer layers. Such methods are known to those of ordinary skill in the art, as further details are described in, inter alia, U.S. Pat. Nos. 6,285,504 and 5,841,918, which are incorporated herein by reference.

FIG. 10b illustrates another known method of modifying the optical path length referred to as tilt tuning. In FIG. 10b dc filter 10300b is mounted on rotating stage 1090 such that direct or indirect rotation, via controller and circuit 1062 and 1072 respectively, increases the angle of incidence of optical beam 1011. Such method may be desirable as it also physically separates the reflected optical beams by wavelength, as well as provides the desired group delay. The wavelengths penetrating further will exit between the first reflected ray 1012, that co-incident with the incident ray 1001 at the front surface of the dc filter, and ray 1013 depending on the angle of incidence.

Figure 11:
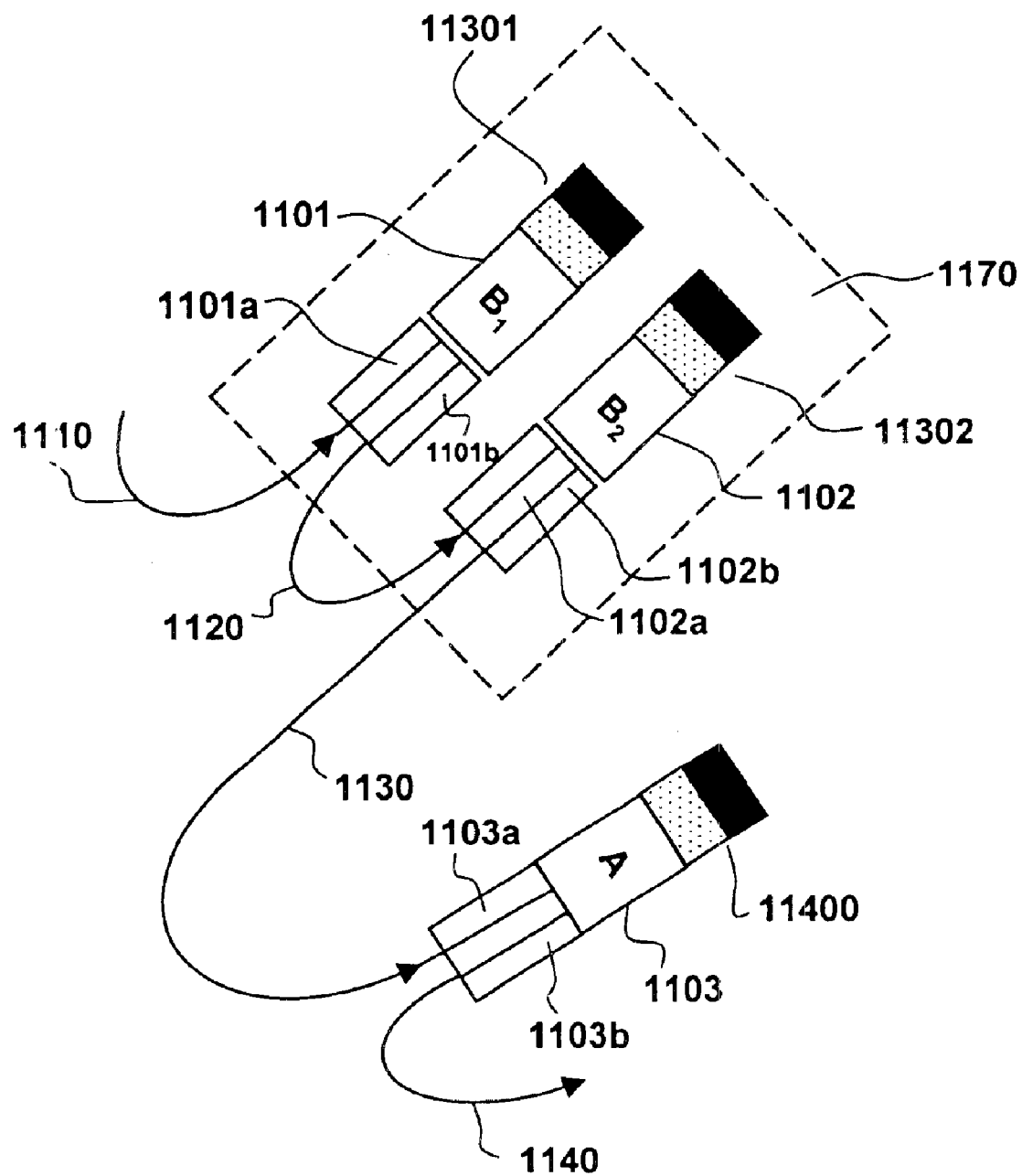
FIG. 11 illustrates another embodiment of the invention showing an optical circuit wherein two tunable dc filters are combined in serial connection with a third dc filter.
Figure 12:
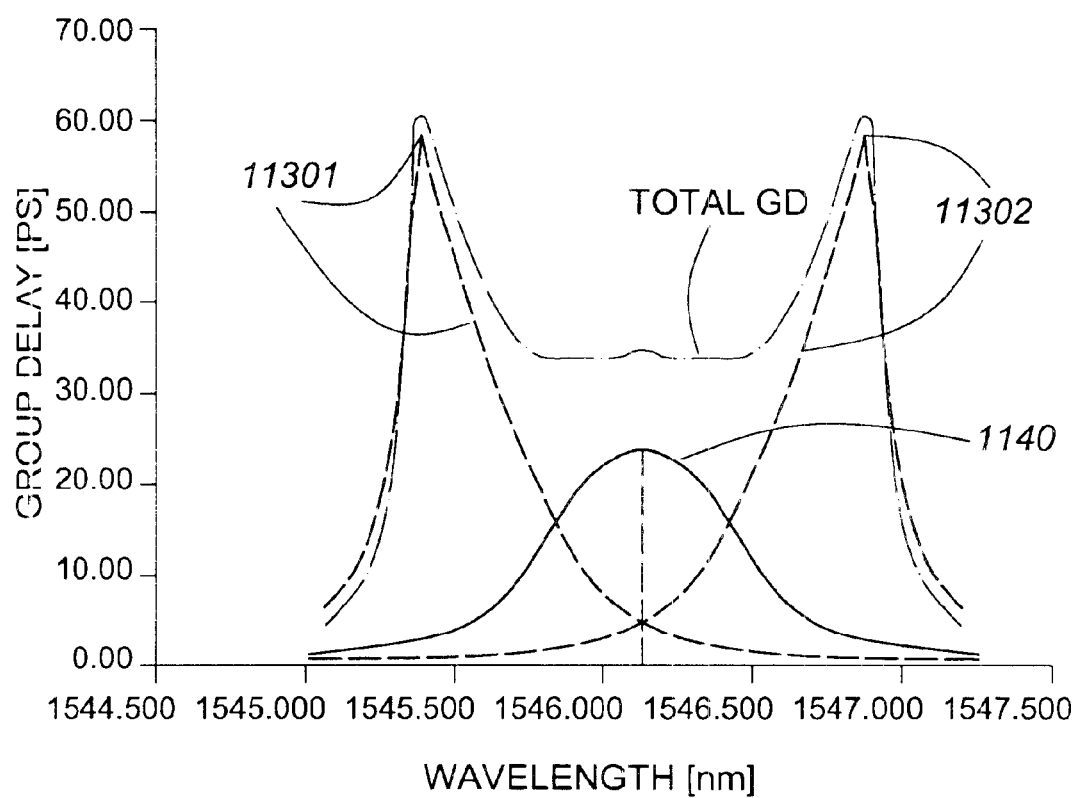
FIG. 12 is a plot showing the theoretical wavelength dependence of the group delay for each of the three dc filters in FIG. 11, having the optical cavity parameters in Table I, and the resultant group delay of the combination.
Figure 13:
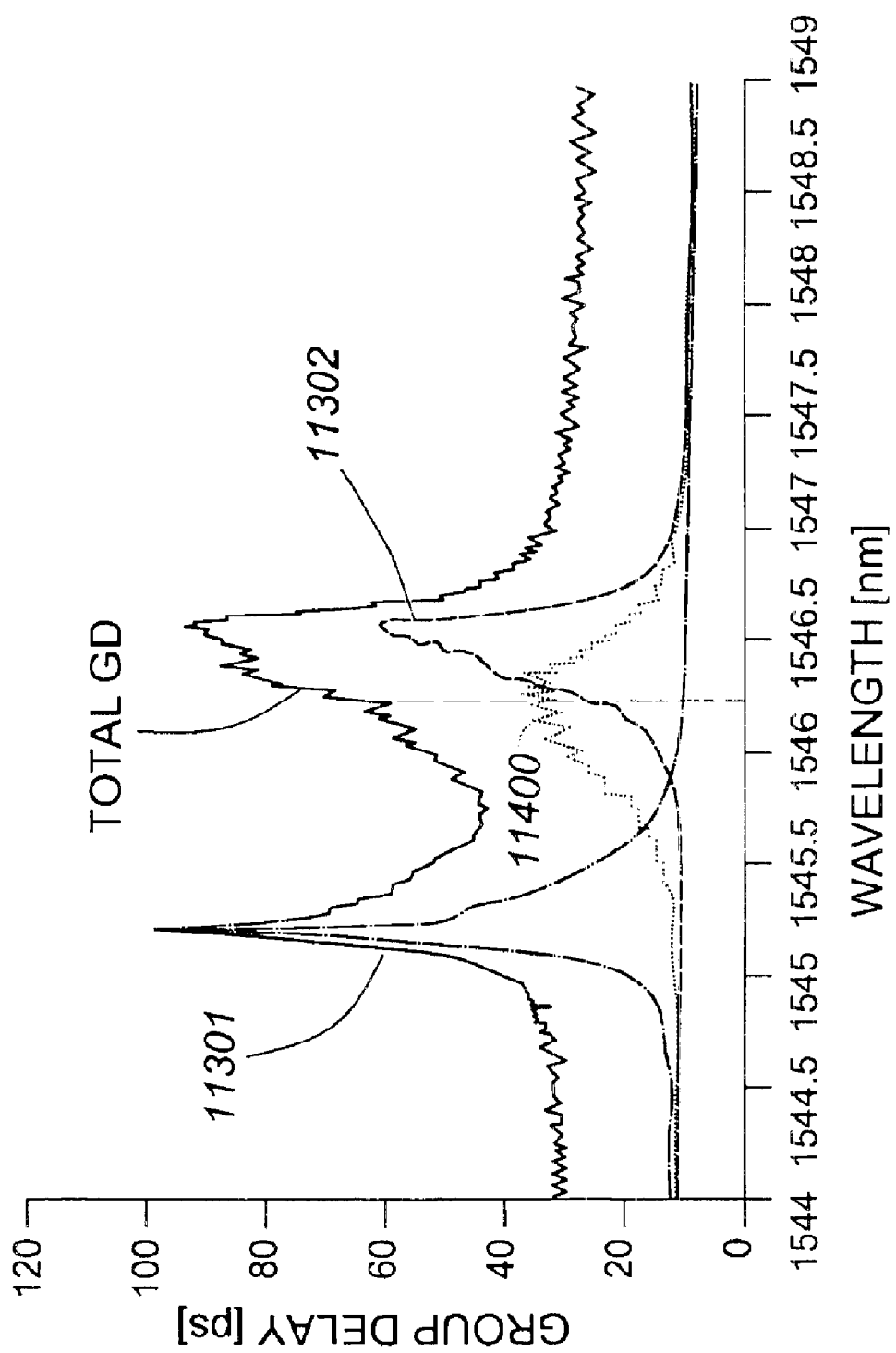
FIG. 13 is a plot showing the actual wavelength dependence of the group delay for each of the three dc filters in FIG. 11 as well the resultant group delay when two of the tunable filters have been shifted to shorter wavelengths.

FIGS. 11 through 13 illustrate another embodiment of the invention wherein a multiplicity of dc filters, including at least one tunable dc filter, can be combined to provide for variable dispersion over a wide bandwidth.

FIG. 11 illustrates the optical communication between the dc filters in optical device 1100. DC filters 11301 and 11302 are connected in serial fashion in thermal communication with a thermal-electric cooler 1170.

The output from these tunable dc filters is then serially connected to a third dc filter 11400 by cascading the reflected light from each dc filter to the next. Thus in device 1100 optical signals arrive via optical fiber 1110 and are modified in GD by dc filters 11301 and 1302 before transmission to dc filter 11400 via optical fiber 1140. Collimating lens 1101 receives optical signals from optical fiber 1110 at first optical port 1101a such that an expanded collimated beam is incident on dc filter 11301. The beam reflected by dc filter 11301 is coupled into optical fiber 1120 at the second optical port 1101b on collimating lens 1101. Collimating lens 1102 then receives all the optical signals from optical fiber 1120 at first optical port 1102a such that an expanded collimated beam is incident on dc filter 11302. The beam reflected by dc filter 11302 is coupled into optical fiber 1130 at the second optical port 1002b on collimating lens 1102. Collimating lens 1103 then receives all the optical signal from optical fiber 1130 at first optical port 1103a to expand the emergent light into a collimated beam that is incident on dc filter 11400. The beam reflected by dc filter 11400 is coupled into optical fiber 1140 at the second optical port 1003b on collimating lens 1003.

DC filter 11400 is preferable thermally stable to have a maximum GD that remains fixed at a center wavelength. Tunable DC filters 11301 and 11302 have either constant or continuously changing dispersion of opposite sign. The plot of theoretical performance in FIG. 12 shows that the maximum in GD of the first tunable dc filter 11301 is centered below the center wavelength of the third dc filter 11400, while the maximum of the GD of the second tunable filter 11302 is centered above the center wavelength of the third dc filter 11400.

The function of this combination is best understood with reference to the actual measured GD as shown in FIG. 13. Heating, or otherwise tuning, dc filters 11301 and 11302 has shifted their respective maximum in GD towards shorter wavelengths such that the maxima are asymmetrically disposed about the center wavelength position of third dc filter 11400. Accordingly, the GD at the center wavelength of dc filter 11400 has increased, from the theoretical value of about 35 picoseconds (ps) in FIG. 12 to about 70 ps in FIG. 13. It should be appreciated that the appropriate wavelength spacing of dc filters 11301 and 11302 provides a range of tuning the GD at the center wavelength of dc filter 11400 with about zero dispersion. Thus more moderate shifts of dc filters 11301 and 11302 permit an increase in GD over a wavelength range defined by the bandwidth of the maximum in GD of dc filter 11400 with zero dispersion.

DC filters 11301, 11302 and 11400 in FIG. 11 each comprise 3 optical cavities as further defined in Table IV.

TABLE IV

|  | Spacer Optical Thickness in nm | Reflectivity, % | Reflector qw optical thickness |
|---|---|---|---|
| Optical Cavity # in filter 11400 |  |  |  |
| 1 | 6184.48 | 94.87 | 1546.12 |
| 2 | 6184.48 | 98.13 | 1546.12 |
| 3 | 6184.48 | 99.01 | 1546.12 |
| Terminal Reflector | — | 99.96 | 1546.12 |
| Layer # in filter 1301 |  |  |  |
| 1 | 1545.02 | 98.82 | 1546.12 |
| 2 | 1544.98 | 99.57 | 1546.12 |
| 3 | 1544.87 | 99.79 | 1546.12 |
| Terminal Reflector | — | 99.98 | 1546.12 |
| Layer # in filter 1302 |  |  |  |
| 1 | 1547.22 | 98.82 | 1546.12 |
| 2 | 1547.26 | 99.57 | 1546.12 |
| 3 | 1547.37 | 99.79 | 1546.12 |
| Terminal Reflector | — | 99.98 | 1546.12 |

Figure 14:
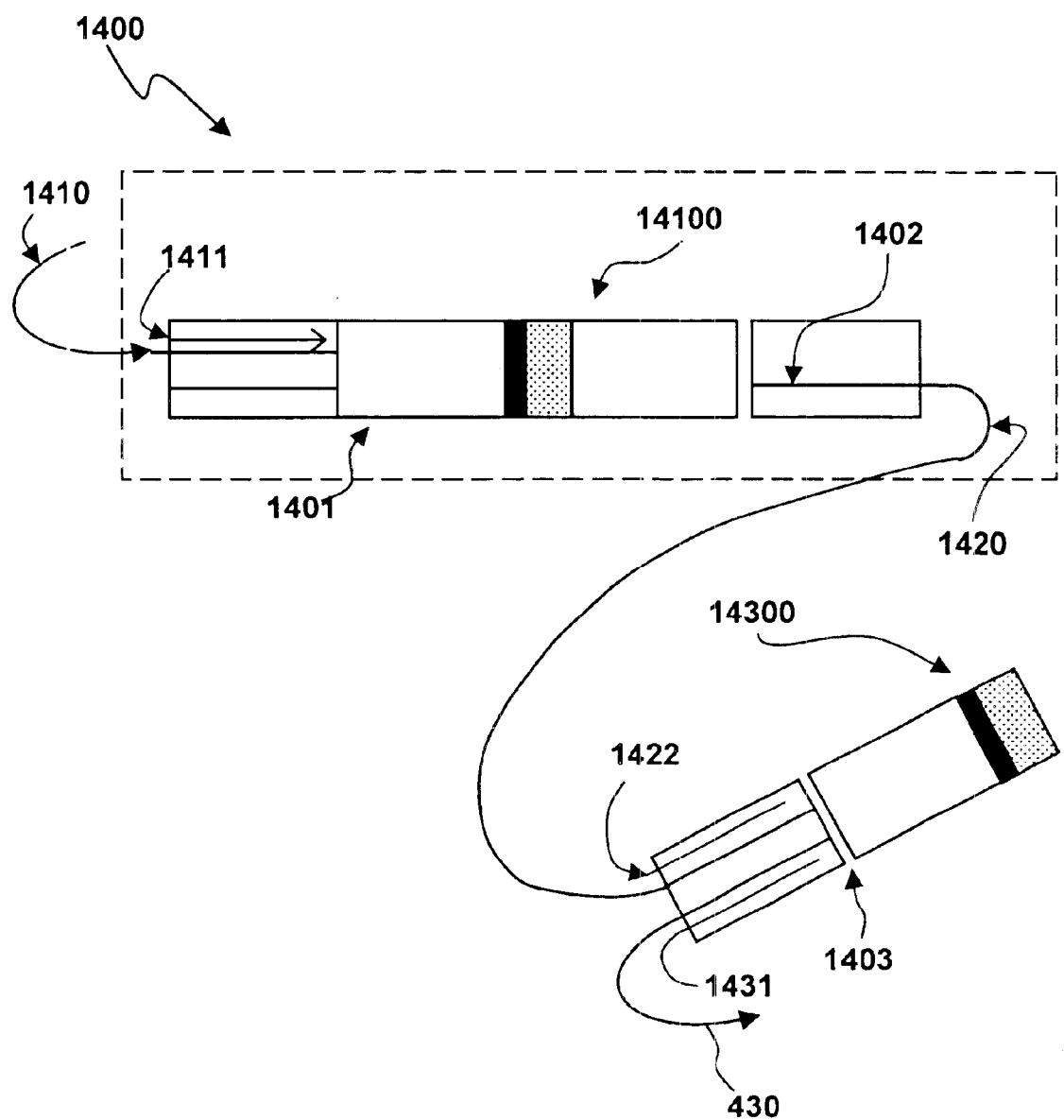
FIG. 14 illustrates another embodiment of the invention showing an optical circuit wherein a tunable transmissive filter is combined in serial connection with a second dc filter providing a demultiplexing function and tunable dispersion, i.e. non-constant GD, across the wavelength range transmitted by the tunable filter.

FIG. 14 illustrates another embodiment of the invention showing an optical circuit wherein a tunable transmissive filter is combined in serial connection with a second dc filter providing a demultiplexing function and tunable dispersion, i.e. non-constant GD, across the wavelength range transmitted by the tunable filter. This is substantially accomplished by combining the transmissive filter in FIG. 1 with the dc filter in FIG. 3.

In device 1400 optical signals arriving at tunable transmissive filter 14301 via optical fiber 1410 are subsequently compensated by dc filter 14300. Collimating lens 1401 receives optical signals from optical fiber 1410 at optical port 1411 such that an expanded collimated beam is incident on tunable transmissive filter 14100. Another collimating lens 1402 couples transmitted light into optical fiber segment 1420 for transmission to dc filter 14300 via collimating lens 1403. Collimating lens 1403 receives optical signals from optical fiber 1420 at optical port 1422 such that an expanded collimated beam is incident dc filter 14300. The beam reflected by dc filter 4300 is coupled into optical fiber 1430 at optical port 1431 on collimating lens 403. Whereas wavelengths reflected by tunable transmissive filter 14100 are demultiplexed, as collimating lens 1401 couples the reflected beam into optical fiber segment 1440 avoiding the tunable wavelength dependent group delay of filters 14301 and 14400 without beam attenuation.

DC filter 14400 is preferable thermally stable to have a maximum GD that remains fixed at a center wavelength. Tunable transmissive filter 14301 has variable GD and dispersion comparable to the combination of tunable dc filters 11301 and 1130 as illustrated in FIG. 1, by providing a high positive and high negative dispersion which is tunable with respect to the center wavelength of dc filter 14400. However, as transmissive filter is a bandpass filter it can provide a variable dispersion over a very narrow bandwidth. Additionally, device 1400 provides a demultplexing function for wavelengths that are not to be dispersion compensated.

It should be noted that the replacement of collimator 1401 in FIG. 14 with a high reflector provides a method of increasing the dispersion range of the tunable device 1400 by a factor of 2, as multiply passed signal will incur twice the group delay. In this case optical fiber segmental 420 is connected at optical port 1431 on collimating lens 1403, rather than collimating lens 1402.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A dispersion compensating filter comprising:
   a. a first optical cavity for receiving an optical signal beam from a direction corresponding to a first side, the optical cavity comprising;
      i. a first thin film spacer, and
      ii. a first pair of dielectric reflector stacks surrounding the first thin film spacer,
   b. a second optical cavity having a first side disposed toward and in optical communication with the second side of said first optical cavity to provide a transmission bandwidth BW, the second optical cavity comprising;
      i. a second thin film spacer, and
      ii. a second pair of dielectric reflector stacks surrounding the second thin film spacer,
   c. a reflector disposed in optical communication with the second side of said second optical cavity, the reflector characterized by a reflectivity of greater than about 95% over a bandwidth BWR,
   d. wherein the optical coupling of the first and second optical cavity provides a maxima in group delay $GD(\lambda)$ over bandwidth BW at a center wavelength position wherein BW is less than BWR, and
   e. the physical thickness of the first and second thin film spacers are less than about 200 microns.

2. A dispersion compensating filter according to claim 1 wherein the group delay $GD(\lambda)$ is a maximum at a center wavelength characteristic of 2 or more optical cavities and decreases monotonically from the center wavelength over bandwidth BW.

3. A dispersion compensating filter according to claim 1 wherein BW is less about 200 Ghz.

4. A dispersion compensating filter according to claim 1 wherein BW is no more than about 1.6 nm wherein said reflector is an all dielectric filter comprising a quarter wave stack having a stop band overlapping the center wavelength defined by the two or more optical cavities.

5. A dispersion compensating filter according to claim 1 wherein the group delay $GD(\lambda)$ varies linearly such that the dispersion, $dGD(\lambda)/d\lambda$, is substantially constant across bandwidth BW.

6. A dispersion compensating filter according to claim 1 wherein the group delay $GD(\lambda)$ is non-linearly decreasing or increasing over the bandwidth BW such that the dispersion, $dGD(\lambda)/d\lambda$ is not constant across bandwidth BW.

7. A dispersion compensating filter according to claim 1 wherein said reflector is an all dielectric filter comprising a quarter wave stack having a stop band overlapping the center wavelength defined by the two or more optical cavities.

8. A dispersion compensating filter according to claim 1 wherein said reflector is a metal.

9. A dispersion compensating filter according to claim 1 wherein said reflector comprises a metal thin film layer disposed on a supporting substrate.

10. A dispersion compensating filter according to claim 1 wherein at least two of the first and second optical cavities and reflector are in physical contact.

11. A dispersion compensating filter according to claim 1 wherein the reflectivity of the second optical cavity is characterized by a greater reflectivity than the first optical cavity.

12. A dispersion compensating filter according to claim 1 wherein the first side of the first optical cavity is disposed on a substantially transparent substrate.

13. A dispersion compensating filter according to claim 1 wherein the side of the reflector opposing the second optical cavity is disposed on a supporting substrate.

14. A dispersion compensating filter according to claim 1 wherein the reflector comprises a dielectric filter comprising a quarter wave stack having a stop band centered at the transmission center wavelength defined by the first and second optical cavity.

15. A dispersion compensating filter according to claim 1 wherein the group delay is constant over the BW.

16. A dispersion compensating filter according to claim 1 wherein the group delay varies linearly to provide a constant dispersion output response within at least a predetermined wavelength band defined by two or more spacers of unequal optical thickness.

17. A dispersion compensating filter according to claim 1 wherein the group delay provides a variable dispersion output response within at least a predetermined wavelength band defined by two or more spacers of unequal optical thickness.

18. A dispersion compensating filter according to claim 1 wherein the group delay is non-linearly variable within at least a predetermined wavelength band.

19. A dispersion compensating filter according to claim 1 wherein the optical thickness of each spacer varies by an incremental value between 2 or more optical cavities.

20. A dispersion compensating filter according to claim 1 wherein the reflectivity of each pair of dielectric reflector stacks increases from the first to last optical cavity.

21. A dispersion compensating filter according to claim 1 wherein the reflectivity of each pair of dielectric reflector stacks increases from the first to last optical cavity and the optical thickness of each spacer varies incrementally from the first to the last optical cavity.

* * * * *